Figure 1:
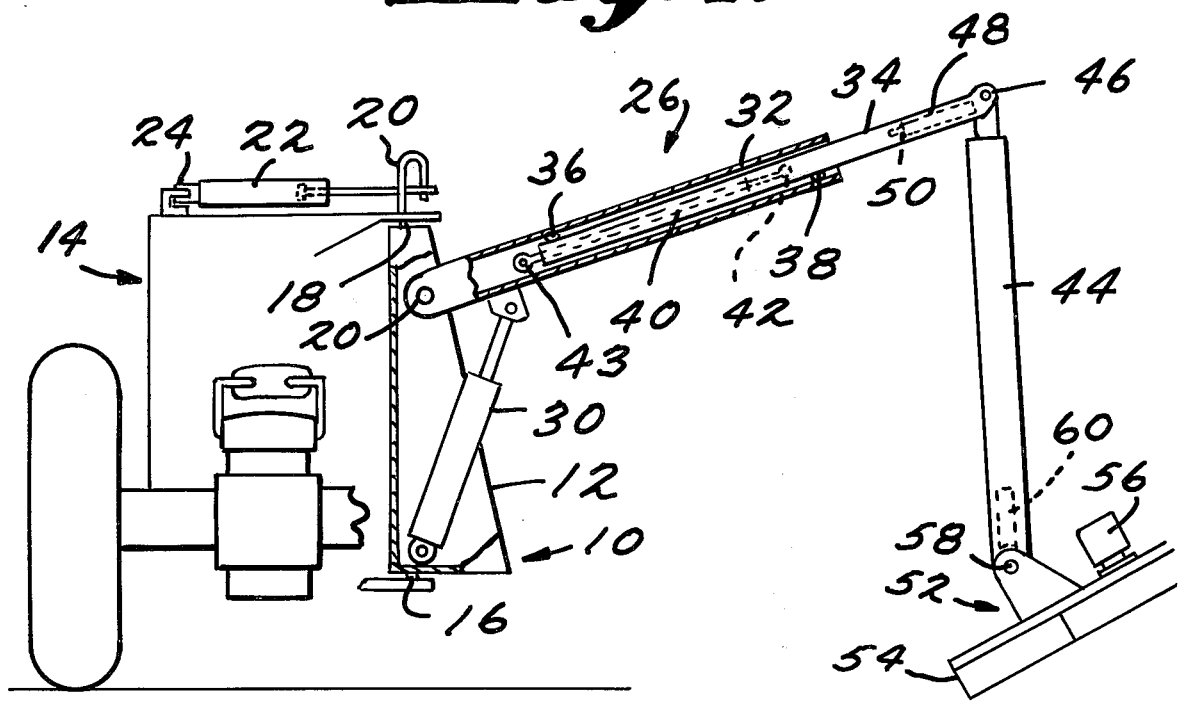

United States Patent [19]
Cartner

[11] 3,949,539
[45] Apr. 13, 1976

[54] HYDRAULIC MOWER ATTACHMENT

[76] Inventor: Jack O. Cartner, 1005 N. 8th St., Cambridge, Ohio 43725

[22] Filed: June 27, 1974

[21] Appl. No.: 483,781

Related U.S. Application Data

[63] Continuation of Ser. No. 211,051, Dec. 22, 1971, abandoned.

[52] U.S. Cl. ................ 56/10.4; 56/10.7; 56/10.9; 56/15.2; 56/15.5
[51] Int. Cl.² .......................................... A01D 75/18
[58] Field of Search ......... 56/10.4, 10.9, 11.9, 15.5, 56/15.9, 16.2, DIG. 15, 10.7, 15.2, 15.7; 91/437; 60/468; 182/2

[56] References Cited
UNITED STATES PATENTS

| | | | |
|---|---|---|---|
| 2,267,284 | 12/1941 | Livers | 60/468 |
| 2,477,669 | 8/1949 | Stephens | 91/437 |
| 3,087,296 | 4/1963 | Cowles | 56/11.9 X |
| 3,221,482 | 12/1965 | Cowling | 56/10.4 X |
| 3,236,036 | 2/1966 | Bailey et al. | 56/10.7 |
| 3,319,407 | 5/1967 | Jordan et al. | 56/10.4 X |
| 3,378,103 | 4/1968 | Zwight et al. | 182/2 |
| 3,462,925 | 8/1969 | Lanier | 56/10.9 |

*Primary Examiner*—Hugh R. Chamblee
*Assistant Examiner*—James D. Hamilton
*Attorney, Agent, or Firm*—Cushman, Darby & Cushman

[57] ABSTRACT

A mowing attachment for a tractor includes a horizontally and vertically swinging telescopic boom for positioning the cutter assembly. The horizontal swinging movement is controlled by a hydraulic circuit which includes a piston and cylinder unit and a pressure relief circuit for allowing relative movement between the piston and cylinder when the cutter strikes an obstruction.

3 Claims, 2 Drawing Figures

U.S. Patent  April 13, 1976  3,949,539

HYDRAULIC MOWER ATTACHMENT

This is a continuation, of application Ser. No. 211,051 filed Dec. 22, 1971 now abandoned.

This invention relates to mowing attachments of the kind carried by a tractor or the like in a manner such that the cutting head is adjustable to a variety of positions in front of and laterally of the vehicle.

According to one feature of the present invention, a mower attachment includes a telescopic boom pivoted for horizontal and vertical swinging movements and provided with hydraulic controls such that the extendable parts of the boom are always under the control of the operator and such that the boom will "break away" in either direction, that is swing horizontally in either direction under the external force generated when an obstacle is encountered during movement of the vehicle or during swinging of the boom.

According to another feature of the invention, the two-directional hydraulic break-away feature is constructed by providing the hydraulic swing ram with two pressure relief valves and two check valves which are arranged with the hydraulic swing ram in a manner to allow the pressure fluid to be readily displaced from one side of the ram piston and to be supplied to the other side during break-away movement.

Figure 2:
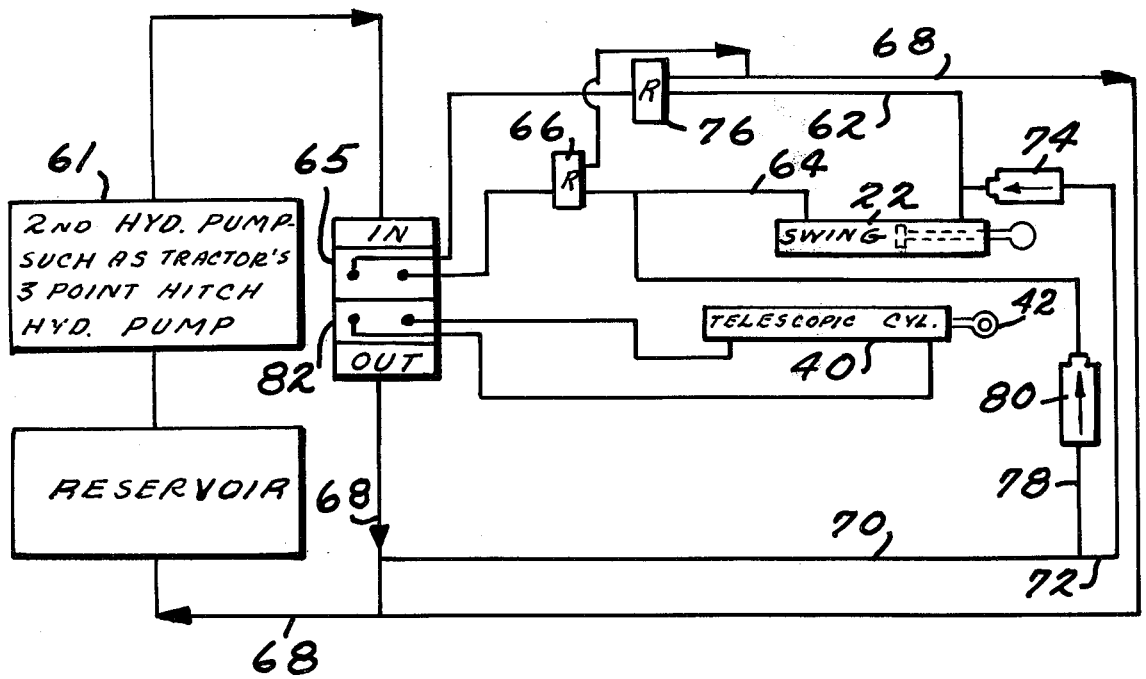

The invention will be further understood from the following more detailed description taken with the drawing in which:

FIG. 1 is a schematic rearend view, partly broken away, of a tractor fitted with a mower attachment, and FIG. 2 is a block diagram of the hydraulic control system for the mower attachment of FIG. 1.

As seen in FIG. 1 the mower attachment at its inboard end includes a vertical mast 10 in the form of an outwardly facing channel member 12 which is pivotally mounted on a tractor 14 for rotation about a vertical axis. The mounting means is shown schematically as including a lower pin 16 and an upper pin 18 both of which are journalled in the tractor frame or in suitable supporting structure fixed to the frame. An inverted U-shaped rigid extension 20 of the upper pin 18 is pivotally connected to one end of a hydraulic swing ram 22, the other end of which is pivoted to the tractor frame as at 24.

Extending from the mast 10 is a boom assembly 26 having its inner end pivoted to the mast 10 as at 20 for swinging movement in a vertical plane. A hydraulic hoist ram 30 positioned below the boom assembly 26 is pivotally connected between the mast 10 and the boom assembly 26 for supporting and controlling the angular position of the latter. As shown, the boom assembly 26 includes an outer tubular member 32 and an inner tubular member 34 which is extendable and retractable relative to the outer member 32. Rollers 36 carried externally on the inboard top end of the inner member 34 bear against the inner surface of the outer member 32. Rollers 38 carried internally on the outboard bottom end of the outer member 32 bear against the lower surface of the inner member 34.

Telescoping movement of the inner member 34 is achieved with a hydraulic ram 40, disposed within the inner member 34, and having its outer end connected to the inner member 34 at 42 and its inner end connected to the outer member at 43. The ram 40 maintains the desired degree of extension of the member 34 at all times regardless of the angle of inclination of the boom.

A tubular arm 44 is pivotally connected at 46 to the outer end of the inner boom member 34 for swinging movement in a vertical plane. The position of the arm 44 is controlled by a hydraulic ram 48 disposed within the member 34 and pivotally connected at its inner end to the member 34 at 50. The outer end of the ram 48 is pivotally connected to a lever (not shown) which in turn is pivoted to the arm 44, the arrangement being such that the arm 44 can be extended straight out from the member 34 if desired.

A cutter assembly 52, such as a rotary blade mounted within a housing 54 and driven by a hydraulic motor 56, is pivotally connected to the outer end of the arm at 58 for swinging movement in a vertical plane. The assembly 52 is positioned relative to the arm 44 by a hydraulic cylinder 60 disposed within the arm 44 and connected at its opposite ends to the arm 44 and to the assembly 52.

FIG. 2 illustrates hydraulic circuit for the swing ram 22. In the illustrated embodiment the circuit includes a hydraulic pump 61 driven by the power-take-off of the tractor, but the power source could equally well be the main hydraulic pump of the tractor. The swing cylinder receives pressure fluid from either of lines 62 or 64 under the control of a conventional manually-controlled valve 65 which has a center position in which the flow of fluid in both of lines 62 and 64 is blocked, thereby locking the swing ram 22 in any desired position. Assuming that the ram 22 is so locked in the position illustrated and further assuming that the cutter assembly 52 strikes as stationary object from such a direction that the ram piston will be forced to the left, then pressure fluid will flow out of the ram cylinder through a relief valve 66 in the line 64, into an exhaust line 68 and then back to the right side of the ram piston by way of a return line 70, 72, a check valve 74 and the line 62. A force exerted on the cutter assembly in the opposite direction such that the ram piston will be forced to the right causes pressure fluid to flow out of the ram cylinder through a second relieve valve 76 in the line 62, into the exhaust line 68 and then back to the left side of the ram piston by way of a return line 70, 78, a second check valve 80 and the line 64. The same sequence of flow occurs when the valve 65 is positioned to pressurize either the line 62 or the line 64 and when an obstacle is encountered.

When the piston of cylinder 22 is moved to the right, the oil forced through relief valve 76 is not sufficient to fill the void on the left hand side of the piston of said cylinder 22, and this shortage is made up by flow coming from the reservoir through valve 80. When the piston 22 is moved to the left the volume of oil forced through the relief valve 66 exceeds the volume created on the right hand side of the piston 22, and this surplus passes to the reservoir.

The boom ram 40 is operated by the pump 61 through a manually controlled valve 82 which is of a conventional type having a center position which blocks the flow of pressure fluid into and out of its control lines. The rams 30, 48 and 60 are assumed to be operated from a separate pump (not shown) on the tractor.

While the break-away feature has been disclosed in combination with a boom type mowing device, the hydraulic circuit may be employed in other applications to achieve an analogous function.

What is claimed is:

1. In a mowing attachment for use in combination with a tractor or the like: a support rotatable through an arc about a vertical axis; a double-acting hydraulic piston and cylinder connected with said support, said piston and cylinder being of the type having a piston rod extending from only one end of the cylinder; a control valve connected between the ends of said cylinder for blocking hydraulic flow through said control valve to and from the piston and cylinder to thereby lock said support in any of a variety of angular positions relative to said axis and hydraulic relief means associated with said piston and cylinder permitting operation thereof in either direction when an external force greater than a preselected force is applied to said support and when hydraulic flow is blocked by said control valve, said relief means including a hydraulic fluid reservoir and valve means for permitting displacement of pressure fluid from one side of the piston to the other side of the piston and for simultaneously passing hydraulic fluid into or out of said reservoir to compensate for the excess or insufficient hydraulic fluid, respectively, resulting from movement of the piston in one direction or the other when said external force is applied; a telescopic boom assembly pivoted at its inner end to said support for rotation about a pivot axis in a vertical plane, said boom assembly extending away from the pivot axis in only a single direction and including at least first and second longitudinally extending parallel members and a hydraulic ram connected between said members for effecting relative longitudinal movement between said members, for limiting the extent of such movement in both directions and for locking said members in any of a variety of relative longitudinal positions; an elongated arm pivoted at one end to the outer end of the boom assembly for swinging movement in a vertical plane and a hydraulic ram connected between said boom assembly and said arm for effecting said swinging movement and for locking said arm in any of a vareity of angular positions relative to said boom assembly; a cutter assembly pivoted to the opposite end of said arm for swinging movement in the same vertical plane as said arm and a hydraulic ram for positioning said assembly relative to said arm.

2. In a mowing attachment for a tractor of the like: a boom assembly having an inner end and an outer end; means mounting the inner end of the boom assembly for swinging movement about a horizontal axis and a vertical axis; hydraulic means for adjusting the angular position of the boom assembly relative to the vertical axis, said hydraulic means including a double-acting hydraulic ram, a control valve and hydraulic circuit for operating said ram in either direction and for hydraulically locking said ram in desired positions by blocking hydraulic flow to and from said ram, said circuit including first and second hydraulic pressure lines connecting said valve to opposite ends of said ram and a hydraulic reservoir, and means permitting operation of the locked ram in either direction when an external force of substantial magnitude is applied to said ram and when hydraulic flow is blocked by said control valve, said means including first and second pressure relief valves connected in said first and second hydraulic pressure lines respectively for relieving pressure to said reservoir, and first and second check valves connected between said hydraulic reservoir and said first and second pressure lines, respectively, at locations intermediate said relief valves and said ram, said check valves passing hydraulic fluid only into said ram.

3. In a mowing attachment for use in combination with a tractor or the like: a support rotatable through an arc about a vertical axis; a boom having an inner end and an outer end; means mounting the inner end of said boom to said support for swinging movement in a vertical plane; means for adjusting the angular position of said boom in said vertical plane; a cutter assembly; means connecting said cutter assembly to the outer end of said boom; a double-acting hydraulic piston and cylinder connected with said support, said piston and cylinder being of the type having a piston rod extending from only one end of the cylinder; a control valve connected between the ends of said cylinder for blocking hydraulic flow through said control valve to and from the piston and cylinder to thereby lock said support in any of a variety of angular positions relative to said axis and hydraulic relief means associated with said piston and cylinder permitting operation thereof in either direction when an external turning force greater than a preselected force is applied to said support, as by engagement of said cutter assembly or said boom with an obstacle, and when hydraulic flow is blocked by said control valve, said relief means including a hydraulic-fluid reservoir and valve means operable upon application of said external force in one direction to pass hydraulic fluid from one side of said piston to the other side of said piston while simultaneously passing a compensating amount of hydraulic fluid to said reservoir, said valve means being further operable upon application of said external force in the other direction to pass hydraulic fluid from said other side of said piston to said one side while simultaneously passing a compensating amount of hydraulic fluid from said reservoir to said one side of said piston.

* * * * *